June 27, 1944.  D. C. KITSELMAN  2,352,391

FLEXIBLE TENSION MEMBER

Filed March 11, 1943

INVENTOR:
DONALD C. KITSELMAN

BY Robert B. Terry
ATTORNEY

Patented June 27, 1944

2,352,391

UNITED STATES PATENT OFFICE 2,352,391

FLEXIBLE TENSION MEMBER

Donald C. Kitselman, United States Army, Las Vegas, Nev.

Application March 11, 1943, Serial No. 478,811

8 Claims. (Cl. 74—501)

This invention relates to improvements in flexible tension members, and particularly to tension members of types adapted for motion transmission, for example in connection with the control cables of aircraft. The invention is particularly directed to a shot-resisting control cable for military or naval use, as in aircraft or other apparatus exposed to bullet or shell fire.

In recent aerial combat experience, control failures have not infrequently occurred by reason of partial or total severance of control cables by direct enemy fire, and in some cases by fragments such as shrapnel. It follows without saying that while such hazards are incurred in many cases as a result of chance shots, serious results often follow in that the ship is in many cases forced out of control at least as to those specific control elements affected by cable severance. The present invention accordingly has as its principal object, a minimization of this hazard by reason of an improved cable construction for the purpose noted.

Structurally considered, one of the important objects of the invention is so to construct a flexible tension element such as a cable, in such manner that the effective tensile loading thereon is divided between a number of spaced tension elements, and such that if any one of such elements is shot through or otherwise severed, the severed element nevertheless will remain substantially in initial position, and at least a portion of the initial tension thereon transferred to such other of the main tension members as remain intact.

A further object is attained in an improved flexible control cable suitable for the purpose noted, and which is preferably of hollow construction in order to minimize the hazard of failure due to severance of a portion of the cable, as by shot penetration.

Yet another object akin to and predicated somewhat upon others stated, is attained in an improved arrangement of a plurality of spaced main tension wires, so arranged with respect to associated cable elements that upon severance of any main wire, the severed wire will immediately be more tightly held, as by frictional gripping thereof by associated elements, so as to tend to maintain the initial position of the main wire, and partly at least to maintain its function as one of the load transmitting elements.

Still otherwise expressed, an additional object is attained in an improved flexible control cable construction which is of self-sustaining tubiform shape, and yet of such construction as to permit flexing or bending within limits, as in the operation of controls for aircraft.

A further object is attained in the production of a flexible tubiform wire cable, adapted for control actuating purposes and which may be produced as a complete article of manufacture including permanently assembled anchorage fittings, and which possesses unusual shot-resisting characteristics such as to enable severance of a substantial portion of the cable without completely destroying its utility and function.

The foregoing and still further objects will more clearly appear from the following detailed description of a single selected embodiment of the invention, particularly when considered in connection with the accompanying drawing, in which.

Figure 1:
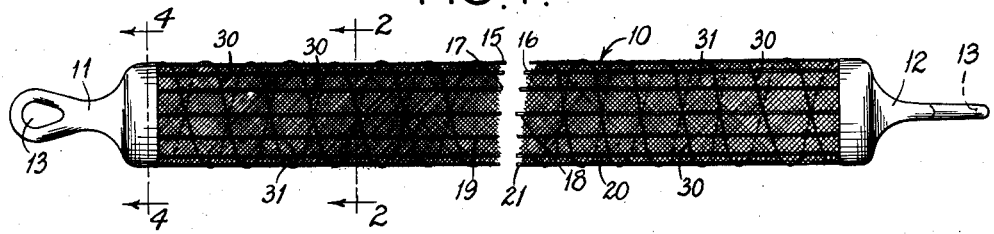
Fig. 1 is a side elevation of a length of prefabricated flexible control cable suitable for aircraft use, and including end fittings in metallic union with the end portions of the several wire elements of the cable.

Proceeding now to a description of the structure shown by the drawing, the cable generally is indicated at 10, and is by preference manufactured by means of suitable and, for the most part, conventional wire weaving equipment of the general types now utilized for the production say of woven wire fencing, hardware cloth, wire screen and the like, minor adaptations of the equipment being made to produce the finished cable in preferably a generally cylindrical exterior shaping substantially as shown. It will be understood, however, that the broad principles of the present design may also be embodied in cable of other than circular cross section, although the latter possesses obvious advantages in production and in usage.

It is a further preference as presently contemplated, that for use in the actuation of aircraft controls, e. g., rudder, elevator and aileron controls, that the cable after forming, be cut or tailored to lengths suitable for actuation of a specific control in aircraft of definite model and type. Included and calculated in the overall length are the requisite end fittings of whatever type may be dictated for operative engagement with the actuating and actuated elements of the aircraft, suitable end anchorage fittings being indicated generally at 11 and 12, and including for convenience of attachment, for example, eye portions 13.

Figure 4:
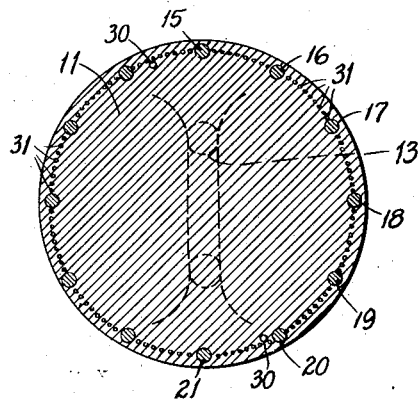
Fig. 4 is a transverse sectional elevation as viewed along line 4—4 of Fig. 1.

As will best appear from Fig. 4, dependable and definite securement of the eye elements 11 and 12 is most desirably effected as by casting the end elements in place in fully embracing relation to the end portions of each and all of the several wire elements of the cable. The end structure suggested will best appear from Fig. 4, wherein this relation is apparent, but will be hereinafter referred to further.

It is contemplated that the cables of the present construction be produced in a somewhat larger diameter than the relatively "solid" cables of current prevalence. This preference is expressed by reason of the different and preferably hollow form of the presently described cable, and for the further reason that it is felt desirable to maintain a more-than-usual spacing between the several main tension elements to be described. It is accordingly advisable to operate the present cable, in conditions wherein it is necessary for the cable to pass over a guide pulley or the like, about somewhat larger radii than usually employed in similar conditions in existing aircraft. The cable is believed best but not exclusively adapted for use in larger aircraft such as bombers, transport and cargo ships, and is felt relatively less suitable but by no means unadaptable for smaller craft such as interceptor-pursuit planes.

Figure 2:
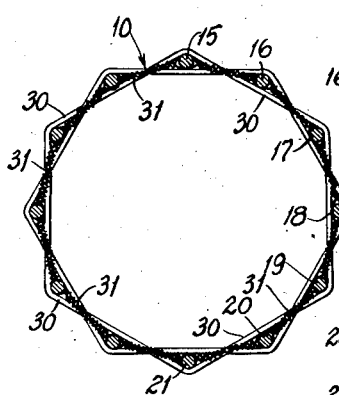
Fig. 2 is an enlarged transverse sectional view taken along line 2—2 of Fig. 1.
Figure 3:
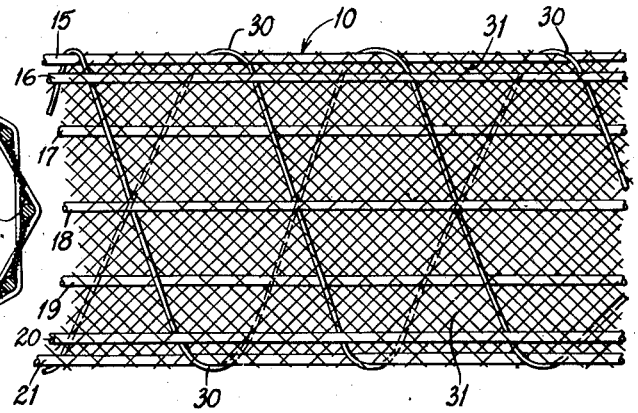
Fig. 3 is an enlarged fragmentary side elevation of the cable showing the relations of its several wire elements as preferably constructed.

Proceeding now to a more detailed structure of the cable per se in a single form advantageously embodying the principles of the invention, there will appear in Fig. 3 a plurality of main control wires such as 15, 16, 17, 18, 19, 20 and 21 only some of which are referred to by reference characters. As appears in Fig. 2 it is preferred to employ a substantial plurality of the main control wires, as the principal longitudinal load-carrying elements; these are spaced substantially from each other as will best appear in the section of Fig. 2, are arranged in mutual parallelism, and are preferably employed in an even number, say a minimum of eight and a maximum of twelve of the main control wires. Merely to provide an example of proportions of the wire elements it may be mentioned that the main control wires such as 15, etc. be of a high quality, high tensile, reasonably flexible steel wire stock and, for example, of 16 gauge. The ends of the main control wires such as 15 are, as will best appear from Fig. 4, firmly embedded in, and each individually embraced by the metal in each of the end fittings 11 and 12.

The cable in the form selected for present description, embodies three different types of wire elements in its construction. Besides the first of these (the main control wires 15 et seq.) there are by preference included one or a plurality of courses of main brace wires all of which are designated by the numeral 30. The main brace wires are shown as laid up in spiral form, and the relation of the several courses of brace wires 30 will readily appear from Figs. 1 and 3, wherein it is seen, in following each of the wires 30 in its pattern both circumferentially and longitudinally of the cable, that the relation of brace wires to main wire constitutes an interwoven assembly wherein each brace wire is directed alternately over and under the successive main control wires. This can perhaps best be observed from the section of Fig. 2. Selecting the main wire 15 for example, it will appear that this is held between a pair of somewhat endwise spaced turns of brace wires 30, the same being true and the same relation prevailing throughout the periphery and length of the cable. It will thus appear that the brace wires serve both as a core or skeleton to prevent any harmful degree of inward collapse of the main control wires, and serve a similar purpose due to the same construction, in preventing any appreciable deflection or distortion of the main control wires outwardly of their substantially peripheral location.

It may here be noted as a preference, particularly for use with certain classes of equipment, so to select the temper of the brace wires 30 that they partake in some measure of the quality of a usual tempered spiral spring, thus serving as shape-maintaining elements or a supporting skeleton for the main control wires.

It now becomes obviously possible if desired, to utilize a light gauge spiral spring (not shown) for any exceptional requirement of support against collapse, internally of the hollow cable structure shown. It will further have now become obvious that, although for simplicity and brevity of description only a single tubular course of each group of the wire elements is mentioned, these may be multiplied inwardly of the structure shown, or outwardly thereof, so as to provide any reasonable tensile strength in motion transmitting tension cables intended say for heavy duty usage in other fields.

It will now be obvious from the description thus far given, that a complete and fully operative cable may be produced, utilizing only the two types of wire elements heretofore described, namely, the main control wires such as 15, and the main brace wires such as 30. Obviously the spacing of the spiral coils or turns of wires 30 may be made less or greater than that shown, with corresponding increase or decrease in number of turns of spiral wire per length unit of cable.

As one example of a suitable gauge of main brace wires, these may conveniently be formed of 19 gauge wire stock, assuming for example main control wires of the order of 16 gauge. The gauges mentioned are, however, merely illustrative and not restrictive.

It has been found advantageous for the purpose of providing at least a partial exterior closure of the tubiform cable, for example, to prevent the entrance to its interior of foreign substances and elements, to utilize a reticulate tubiform sheath, such as mesh formed of woven wire say of the order of 23 gauge. When utilizing this third group of wire elements in the construction of the cable, as is preferred, it is applicant's choice that the wire mesh be made to augment the function of the brace wires 30, rather than merely to serve as a partial peripheral enclosure. The structural advantage of the tubuluar wire mesh appears presently to be best realized by building it into the cable at the time of laying up the main control wires and brace wires, and in causing the mesh indicated generally at 31, to be laid up in two courses, or any desired greater plurality of courses, in such manner that the groups or courses of the mesh-forming wires, similarly to the brace wire construction, engage the main control wires in over-and-under relation, as best appears from Figs. 2 and 3. This relation is furthermore apparent by observing the alternately outward and inward placement of adjacent mesh-forming wires, in following for example, a single one of the main longitudinal control wires lengthwise, say from left to right as seen in Fig. 3.

Numerous variants are of course possible in the specific relation between the two or three (if utilized) broad groups of wire elements constituting the cable. The preference and principle is however that whatever weaving variance be adopted in production, the arrangement be such that the two or three groups of elements normally augment in a certain degree, the tensile function of the main control wires. This effect results, as will now have appeared, from the frictional gripping relation of the main control wires by the brace wires as well as by the wire mesh. It will further appear that when the wire mesh is utilized, it is carried fully to the ends of the cable, with the ends of the mesh-forming wires completely embedded and individually embraced in the metal of each of the end fittings as in the case of the main control and brace wires.

The functions of the several groups of wire elements in the cable when the latter is in service, has been briefly referred to in connection with the foregoing description of parts and their structural relation, but it may here be mentioned further for completeness that, in the event any one of the longitudinals or main control wires such as 15, or any plurality thereof, becomes severed as by penetration by a round or fragment to the interior of, or through the cable, the severance of the one or more control wires will result in a very slight elongation, occurring perhaps only locally in the ruptured region of the cable. Immediately following and incident to this severance, the local elongation will cause an augmented gripping effect of the severed longitudinal control wire by both the brace wires and wire mesh. It is for this reason preferred not to unite any of the several described wire elements, fixedly to each other, but rather to permit a slight frictionally opposed, relative displacement. The effect on the main control wires may perhaps be best visualized when compared with the ancient "Japanese handcuff," this effect being obtained in local regions about any one of the severed main control wires. During normal operation however, it will now have appeared that the main control wires serve as primary tension elements, but since the main brace wires are also under some moderate tension, they function as secondary tension elements, even with the wires, such as 15, intact. Also, because of the spiral relation of the mesh forming wires, they too contribute in a small, yet appreciable degree to the total tensile strength of the cable.

It will now have become further apparent that the relatively large hollow interior construction of the present cable offers the advantages of a lattice construction in resisting the action of single rounds fired through spaced regions along the cable. It is fully appreciated that any aircraft control cable even severed only in part by enemy fire or accident, should require renewal upon servicing the plane or other apparatus on which it is used, but it is further confidently stated that in many cases the present structure offers a considerably increased probability of maintaining, through and following enemy action, a useful control of and normal flight conditions in damaged aircraft.

The single example selected for present description, being susceptible of wide variations, is to be understood in a descriptive sense rather than as limiting the possibilities of the invention because of the many changes possible within the scope of the claims hereunto appended.

I claim as my invention:

1. A control cable for the purpose described, consisting of a length of spirally laid, open mesh, fine metal wire tubing, a plurality of widely spaced, substantially longitudinal tension wires supported in and embraced by said tubing, and additional spacing and supporting wires engaging the tension wires.

2. A control cable for the purpose described, consisting of a tube of relatively open, fine wire mesh construction in which the mesh-forming wires are distinctly spaced and laid up at an angle to the axis of the cable, a plurality of widely spaced main tension wires interwoven in said tubing with the wire elements of the tubing arranged increasingly to grip said main wires responsive to any longitudinal extension of the tubing.

3. In a control cable for the purpose described, a tubular cable body including a plurality of relatively widely spaced, longitudinal main tension elements, and a plurality of groups of spiral elements, one of said groups consisting of an open, flexible, fine wire mesh, the spiral elements being so arranged that each of said longitudinal elements is held between spiral elements of the said groups and thereby positioned against extensive movement out of their relative angular and radial positions.

4. A flexible control cable for the purpose described, including a group of main longitudinal control wires, a group or course of spirally arranged brace wires, and a group or course of spirally arranged wire mesh, the wires constituting each of the said groups, being in interwoven relation to at least certain of those of the other groups.

5. The combination and arrangement of elements recited by claim 4, further characterized in that the main control wires, main brace wires and mesh are all confined substantially to a zone in the periphery of the cable and with one of the said spiral courses of wires arranged in over and under relation to the main control wires.

6. A flexible control cable for the general purpose noted, including a plurality of main longitudinal tension wires, widely spaced about the cable, at least two spirally arranged courses of retaining wires, one of said courses arranged to overlie, and other of said courses arranged to underlie, each of the said main tension wires, whereby each of the main wires is frictionally gripped between the wires of the said spiral courses, and a course of wire mesh carried by, and laid up in a bias relation to the main wires.

7. A hollow, reticulate shot-resisting control cable for use in military equipment and consisting of a generally tubiform arrangement of longitudinally disposed main tension wires, substantially spaced from each other, a plurality of spiral wires, widely spaced from each other and so arranged that each main wire is gripped between different spiral wires, said spiral wires being characterized by a temper sufficient to impart and substantially to maintain the tubular form of the cable when subjected to impact or bending effects, and a course of wire mesh in interwoven relation to the main wires.

8. A hollow control cable for the general purposes described, consisting of a plurality of parallel, spaced, main tension wires, a secondary group of wires of somewhat lesser gauge arranged in a spiral course in over and under relation to said main wires and a spiral course of wire mesh in interwoven relation to the main wires.

DONALD C. KITSELMAN.